United States Patent [19]

Henderson

[11] 4,403,783

[45] Sep. 13, 1983

[54] LIQUID AND GRANULAR HAULING TRAILER

[75] Inventor: Frank E. Henderson, Plant City, Fla.

[73] Assignee: Harsco Corporation, Camp Hill, Pa.

[21] Appl. No.: 286,040

[22] Filed: Jul. 22, 1981

[51] Int. Cl.³ .............................................. B60P 3/24
[52] U.S. Cl. .................................. 280/5 G; 105/358; 220/DIG. 24; 280/5 C
[58] Field of Search ............. 280/5 C, 5 D, 5 E, 5 G, 280/5 R; 105/358, 360; 298/8 R; 220/20, DIG. 24

[56] References Cited

U.S. PATENT DOCUMENTS

| D. 138,549 | 8/1944 | Ziegler | D12/95 |
|---|---|---|---|
| D. 150,399 | 8/1948 | Bernstein | D12/95 |
| D. 170,969 | 12/1953 | Clough | 280/5 C |
| 764,390 | 7/1904 | Stoller et al. | 105/359 |
| 1,908,684 | 5/1933 | Buchanan | 280/5 G |
| 3,013,695 | 12/1961 | Caldwell | 222/1 |
| 3,139,286 | 6/1964 | Johnson | 280/5 C |
| 3,277,842 | 10/1966 | Schwartz et al. | 105/358 |
| 3,325,177 | 6/1967 | Welinder | 280/5 C |
| 3,420,419 | 1/1969 | Haslett | 222/544 |
| 3,883,148 | 5/1975 | Miller | 280/5 C |

FOREIGN PATENT DOCUMENTS

| 1024883 | 2/1958 | Fed. Rep. of Germany | 280/5 E |
|---|---|---|---|
| 2317350 | 10/1974 | Fed. Rep. of Germany | 280/5 D |
| 6802800 | 9/1968 | Netherlands | 280/5 C |

*Primary Examiner*—John A. Pekar
*Assistant Examiner*—D. Lynn Fugate
*Attorney, Agent, or Firm*—Kerkam, Stowell, Kondracki & Clarke

[57] ABSTRACT

A truck trailer useful for hauling liquid and granular material includes two liquid end chambers and one center chamber or hopper. The two liquid end chambers are frusto-conical in shape and have insulation within jacket pieces around them. The end chambers are connected by an insulated pipe extending through the center chamber.

15 Claims, 4 Drawing Figures

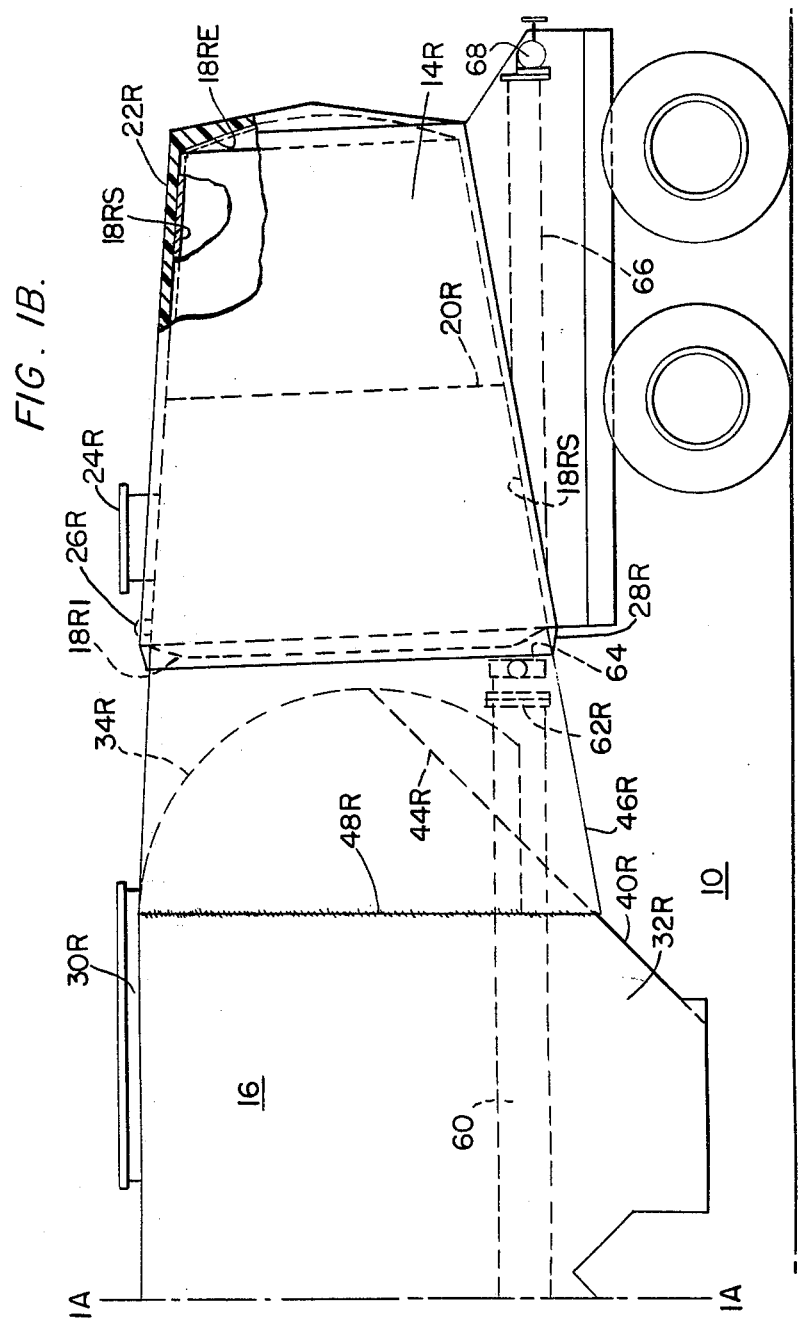

LIQUID AND GRANULAR HAULING TRAILER

BACKGROUND OF THE INVENTION

1. Field of the Invention

The present invention relates to tank vehicles. More specifically, the present invention relates to a truck tank trailer designed for hauling both liquid and granular material.

2. Description of the Prior Art

The truck transportation industry has long sought a vehicle which will permit loaded operation in both directions in travel. This can be accomplished readily when transporting a product in a van trailer or on a flat bed trailer, but very little has been done to provide a vehicle which will transport a liquid and a dry granular product in separate compartments. Liquid trailers are available with separate compartments for different products and dry bulk trailers are available for different products.

The trailer industry has made various attempts to produce a suitable trailer for transporting both liquid products and dry granular products. However, these trailers have been subject to one or more of several disadvantages. Specifically, these trailers are often awkward due to a high center of gravity when loaded with the granular product. High pulling resistance due to large flat frontal areas reduces fuel economy for many of these trailers. Moreover, these trailers are often of excess weight due to elaborate interior frame work. In addition, such liquid/granular trailers are generally unsuitable for transporting thermosetting liquids or other liquid loads requiring insulation.

An object of the present invention is provide a truck trailer suitable for transporting liquid and granular materials and having a relatively low center of gravity for road stability.

A further object of the present invention is provide an improved streamlined truck trailer for transporting liquid and granular materials with good fuel economy.

A still further object of the present invention is to provide a truck trailer for transporting liquid and granular materials and having a relatively simple construction to avoid excessive weight.

Yet another object of the present invention is to provide a truck trailer for transporting liquid and granular materials which is especially convenient for loading and unloading.

A further object of the present invention is to provide a truck trailer for transporting liquid and granular materials wherein the compartments for carrying liquid are insulated.

SUMMARY OF THE INVENTION

The above and other objects of the present invention are accomplished by a vehicle with a tank having a body which extends along an axis, the body having a first end and a second end. The body includes a first end chamber at the first end of the body and defined by a sidewall portion, an exterior end wall portion, and an interior end wall portion. A second end chamber at the second end of the body is defined by a sidewall portion, an exterior end wall portion, and an interior end wall portion. A center chamber is disposed inbetween the interior end wall portion of the first end chamber and the interior end wall portion of the second end chamber. The center chamber is defined by center chamber walls and closed off from the first end chamber and the second end chamber. The body further includes a first port for removing substances from the first end chamber and a pipe connecting the first end chamber and the second end chamber, whereby both the first end chamber and the second end chamber may be emptied through the first port. Preferably, the vehicle is a truck trailer and the first and second end chambers are each disposed within corresponding jacket pieces having insulation. A first sidewall extension portion integral with the sidewall portion of the first end chamber extends past the interior end wall portion of the first end chamber, whereas a second sidewall extension portion integral with the sidewall portion of the second end chamber extends past the interior end wall portion of the second end chamber. The center chamber walls are partly disposed within the first and second sidewall extension portions. Each of the two end chambers is preferably substantially frusto-conical in shape and including a floor which slants down towards the center chamber. The pipe, which is preferably insulated and includes a valve, connects to the first end chamber adjacent its interior end wall and to the second end chamber adjacent its interior end wall.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views.

FIG. 1, composed of parts FIG. 1A and FIG. 1B, shows a sideview of the preferred embodiment of the present invention attached to a conventional truck cab section with several breakaways to show construction details.

DESCRIPTION OF THE PREFERRED EMBODIMENT

In FIG. 1 there is shown the preferred embodiment of the present truck trailer 10 attached to a conventional truck cab section 12. The body of truck trailer 10 extends longitudinally from rear or first end chamber 14R to center chamber 16 to front or second end chamber 14F. The end chambers 14F and 14R are adapted to accommodate liquid loads, whereas the center chamber 16 is designed for transporting dry granular materials. Front end chamber 14F is defined by front exterior wall portion 18FE, front interior wall portion 18FI, and front sidewall portion 18FS all indicated in phantom line. The front end chamber 14F is substantially frustoconical in shape inasmuch as sidewalls 18FS extend conically around chamber 14F, but exterior end wall 18FE is a conical itself. A baffle 20F, shown only schematically, may be included to reduce liquid movement in the tank 14F. Rear end chamber 14R is similarly constructed including rear exterior end wall portion 18RE, rear interior end wall portion 18RI, rear sidewall portion 18RS, and rear baffle 20R.

In order to facilitate the transportation of thermosetting liquid or other liquids requiring insulation, a jacket piece 22F surrounds the end chamber 14F except for its interior side 18FI. The jacket piece 22F is substantially frusto-conical, being configured in the same shape with slightly larger size than the end chamber 14F. In between jacket piece 22F and the walls 18FE and 18FS is a layer of insulation 21. Extending through the insulation and the jacket piece 22F are fill openings 24F and vent 26F. An annular fairing piece 28F extends from the back end of jacket piece 22F. Insulation 21 may also be included outside of front end chamber 14F along its wall 18FI, which wall may be a conical curve as shown. The rear end chamber 14R is substantially similar in construction to the end chamber 14F and includes jacket piece 22R, fill opening 24R, vent 26R and fairing piece 28R.

Continuing to view FIG. 1, but also considering FIG. 2 which is a side view of the center chamber or hopper of the present invention and FIG. 3 which is an end view of the hopper or center chamber of FIG. 2, the details of the center chamber 16 will now be discussed. The center chamber 16 includes two loading hatches 30F and 30R and two pairs of air gates 32F and 32R. The discharge of granular material from center chamber 16 may be made by way of gate pairs 32F and 32R. Alternately, discharge of granular material may be made by pressurized air by replacing air gate pairs 32F and 32R with pneumatic fluidizing equipment pads. The hatches 30F and 30R are gasketed and tightly closed to allow pneumatic discharge.

Figure 2:
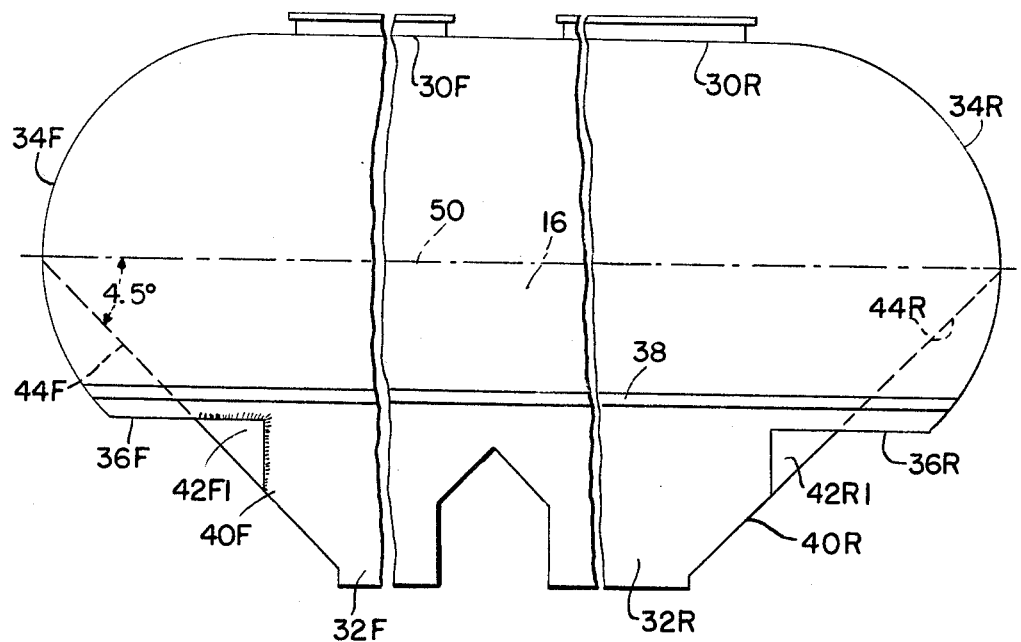
FIG. 2 shows a sideview of the hopper or center chamber of the present invention.

As shown in the drawings, the center hopper 16 is generally cylindrical along its length with hemispherical ends 34F and 34R except that the cylinder and hemispheres are lopped off along a plane perpendicular to the view of FIG. 2 and extending along lower walls 36F and 36R. A saddle piece 38 extends around the complete length of chamber 16. As viewed from above, the saddle piece 38 would be generally semi circular at both ends with straight aways along the sides. Extending downward from lower walls 36F and 36R are exterior slanted walls 40F and 40R respectively. In order to connect the main chamber area of hopper 16 with slanted exterior walls 40F, curved pieces 42F1 and 42R1 are used respectively. Similar pieces 42F2 and 42R2 would be used on that side of hopper 14 not shown in FIG. 2. Each of these pieces 42F1, 42F2, 42R1 and 42R2 is generally triangular, but will of course be curved to properly mate the adjoining surfaces. Inside slant plates 44F and 44R define a boundary of hopper 16, thereby preventing granular materials from being caught respectively on lower walls 36F and 36R. Together, slant plate 44F and slanted exterior wall 40F will be substantially continuous at an angle of approximately 45° to the main axis 50 of center hopper 14, thereby allowing free granular flow down the sides of hopper 16.

Figure 3:
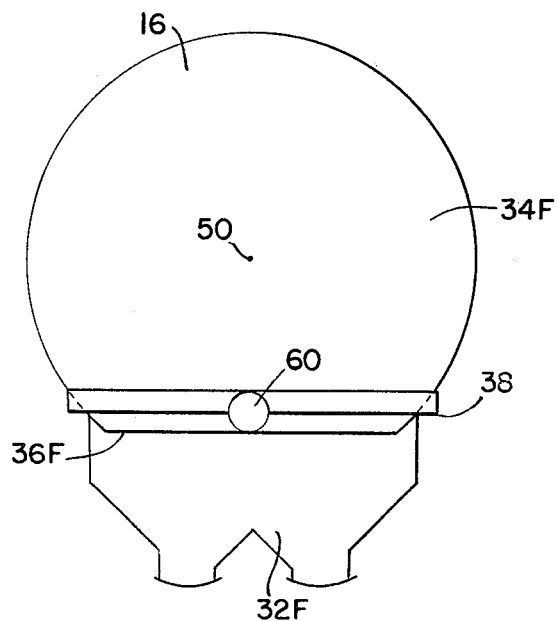
FIG. 3 shows an end view of the hopper or center chamber of the present invention.

As shown in FIGS. 1 and 3, a pipe 60 extends through center chamber 16. Specifically, this pipe connects the liquid end chamber 14F with the second liquid end chamber 14R. The pipe enters the end chambers at the bottoms of interior end walls 18FI and 18FI. Expansion joints 62F and 62R may be included to allow the center section of pipe 60 to expand and contract as need be. Cover plates (not shown) may be located on side wall estension portions 46F and 46R to allow access to expansion joints 62F and 62R. The pipe 60 is preferably insulated in much the same manner as end chambers 14F and 14R, thus having a center liquid carrying pipe surrounded by insulation and a cylindrical jacket (not shown in the drawings). Additionally, a valve 64 may be included to selectively block the pipe 60, whereby chambers 14F and 14R may be selectively isolated from each other. An outlet pipe 66 extends from chamber 14R to a flush valve 68, thus constituting a first port for removing substances from the first or rear end chamber 14R. Note that because the side wall 18RS of chamber 14R is slanted downward towards the center chamber 16 and outlet pipe 66 extends from the bottom of chamber 14R and is slanted slightly downward towards flush valve 68, any liquid in chamber 14R will be more readily removable than would otherwise be the case. If desired, an outlet port similar to outlet pipe 66 and flush valve 68 may be included at front end chamber 14F. However, with valve 64 open either of chambers 14F and 14R may be drained to empty through simple operation of gravity by way of flush valve 68 since, as mentioned, outlet pipe 66 slants downward towards flush valve 68 and, as shown, pipe 60 connects the bottoms of the first and second end chambers. In addition to facilitating the drainage of the end chambers 14F and 14R, the slanting down of the floors towards the center chamber tends to increase the stability of the vehicle by keeping liquid loads towards the center of the vehicle when the liquid chambers are not completely filled.

Figure 1A:
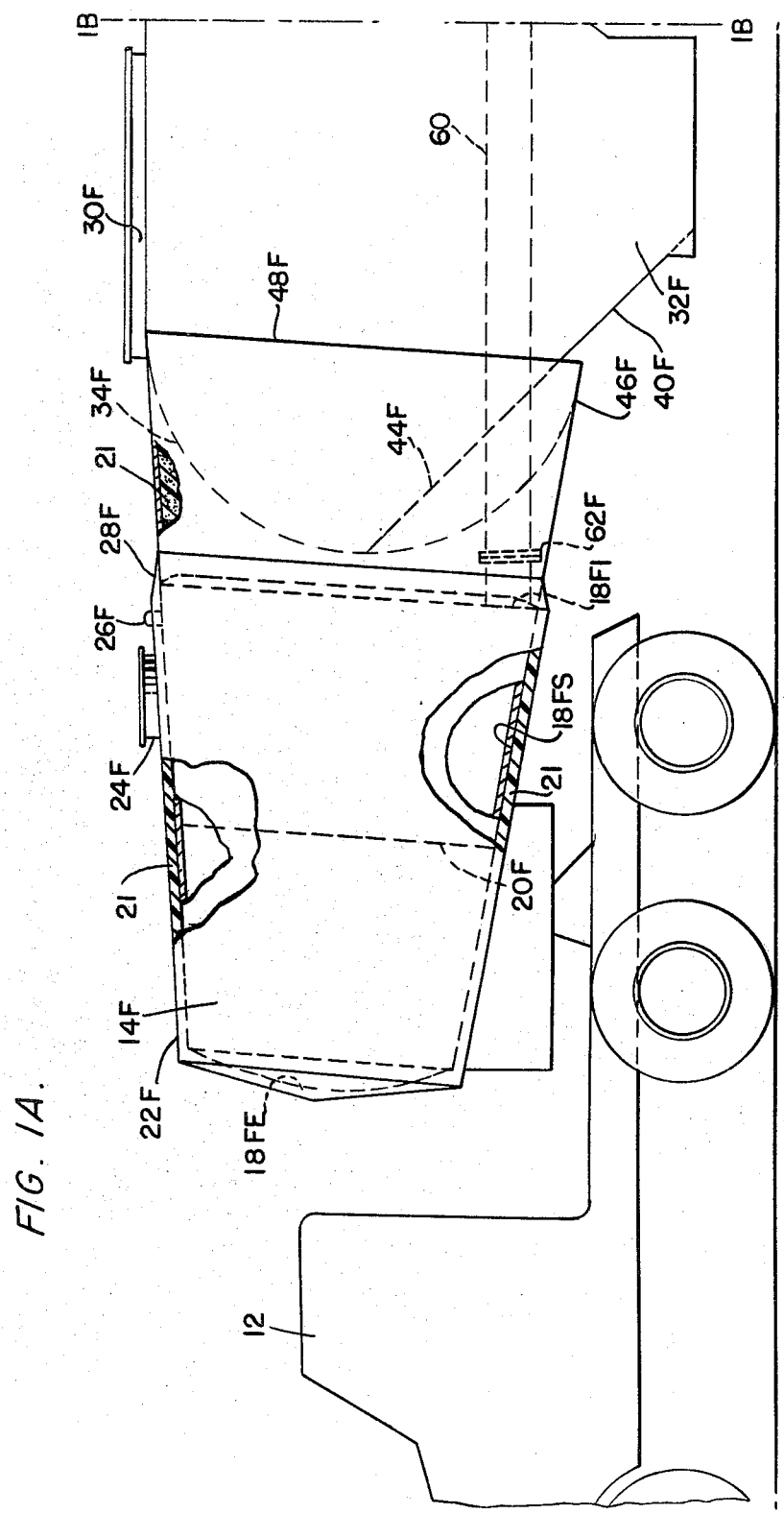

In addition to facilitating the drainage of liquid chambers 14F and 14R, pipe 60 is quite useful in loading the present tank trailer. Specifically, partial liquid loads will be automatically equally distributed in chambers 14F and 14R whether input through fill opening 24F or 24R. That is, the pipe 60 will automatically level liquid loads between the end chambers 14F and 14R. This self-leveling feature will, of course, occur at any level load as is apparent from the FIG. 1A and FIG. 1B showing of the pipe 60 connecting the bottom of the end chambers 14F and 14R. As clearly shown, the pipe 60 extends without rising from chambers 14F to chamber 14R. This is quite preferable to having to put one-half of the liquid load in opening 24F and one-half in opening 24R. It requires only one loading step instead of two.

As shown in FIG. 1, side wall extension portions 46F and 46R extend respectively from sidewalls 18FS and 18RS. Each of the sidewall extension portions is integral with the corresponding sidewall portion and will extend past the interior end wall portions 18FI or 18RI. The walls of center chamber 16 are partly disposed within the first sidewall extension portion 46F and within the second sidewall extension portion 46R. The interface between center chamber or hopper 16 and sidewall extension portions 46F and 46R is accomplished by welding the sidewall extension portions 46F and 46R to the walls of chamber 16 around the entire circumference of chamber 16. Since chamber 16 is generally cylindrical and the sidewall extension portions 46F and 46R are frusto-conical extensions of sidewalls 18FS and 18RS respectively, the interface may be welded along lines 48F and 48R respectively. Of course, sidewall extension portions 46F and 46R would include notches (not shown) to accomodate saddle 38, whereby saddle 38 helps bear the weight of center hopper 16 onto the sidewall extension portions 46F and 46R.

Although the present invention is not limited to any particular materials, the preferred embodiment uses aluminum for the jackets and walls of the chambers of the tank.

Although various specifics of the preferred embodiment have been described herein in detail, it is to be understood that these are for illustrative purposes only. Various modifications and/or adaptations will be readily apparent to those having ordinary skill in the art. Accordingly, the scope of the present invention should be determined by reference to the appended claims.

What is claimed is:

1. A vehicle with a tank having a body which extends along an axis, the body having a first end and a second end comprising:
    a first end chamber at said first end of said body and defined by a side wall portion, an exterior end wall portion, and an interior end wall portion;
    a second end chamber at said second end of said body and defined by a side wall portion, an exterior end wall portion, and an interior end wall portion;
    a center chamber disposed in between said interior end wall portion of said first end chamber and said interior end wall portion of said second end chamber, said center chamber defined by center chamber walls and closed off from both said first end chamber and said second end chamber;
    a first port for removing substances from said first end chamber; and,
    a pipe mounted to said body and connecting said first end chamber to said second end chamber, said pipe extending from the bottom of said interior end wall portion of said second end chamber to the bottom of said interior end wall portion of said first end chamber, said pipe being operative to automatically level liquid loads between said first end chamber and said second end chamber at any level and said pipe and said first port together are operative to empty liquid loads from both said first end chamber and said second end chamber by gravity.

2. The vehicle of claim 1 wherein said vehicle is a truck trailer.

3. The truck trailer of claim 2 wherein said first end chamber is inside of a first jacket piece with insulation in between said first end chamber and said first jacket piece, and said second end chamber is inside of a second jacket piece with insulation in between said second end chamber and said second jacket piece.

4. The truck trailer of claim 2 wherein said first end chamber includes a floor which slants down towards said center chamber and said second end chamber includes a floor which slants downs towards said center chamber.

5. The truck trailer of claim 4 wherein said first end chamber is substantially frusto-conical in shape and said second end chamber is substantially frusto-conical in shape.

6. The truck trailer of claim 2 further including a first side wall extension portion integral with said side wall portion of said first end chamber and extending past said interior end wall portion of said first end chamber and a second side wall extension portion integral with said side wall portion of said second end chamber and extending past said interior end wall portion of said second end chamber, and said center chamber walls are partly disposed within said first side wall extension portion and said second side wall extension portion.

7. The truck trailer of claim 6 wherein said first end chamber includes a floor which slants down towards said center chamber and said second end chamber includes a floor which slants down towards said center chamber and wherein said first end chamber is substantially frusto-conical in shape and said second end chamber is substantially frusto-conical in shape.

8. The truck trailer of claim 7 wherein said first end chamber is inside of a first jacket piece with insulation in between said first end chamber and said first jacket piece, and said second end chamber is inside of a second jacket piece with insulation in between said second end chamber and said second jacket piece.

9. The truck trailer of claim 2 wherein said pipe is an insulated pipe which extends through said center chamber.

10. The truck trailer of claim 2 further including a valve for selectively blocking said pipe.

11. A vehicle with a tank having a body which extends along an axis, the body having a first end and a second end comprising:
    a first end chamber at said first end of said body and defined by a side wall portion, an exterior end wall portion, and an interior end wall portion;
    a second end chamber at said second end of said body and defined by a side wall portion, an exterior end wall portion, and an interior end wall portion;
    a center chamber disposed in between said interior end wall portion of said first end chamber and said interior end wall portion of said second end chamber, said center chamber defined by center chamber walls and closed off from both said first end chamber and said second end chamber;
    a first port for removing substances from said first end chamber; and,
    an insulated pipe mounted to said body and connecting said first end chamber to said second end chamber, and wherein said first end chamber is inside of a first jacket piece with insulation in between said first end chamber and said first jacket piece, and said second end chamber is inside of a second jacket piece with insulation in between said second end chamber and said second jacket piece and said insulated pipe extends from the bottom of said second end chamber to the bottom of said first end chamber.

12. The vehicle of claim 11 wherein said insulated pipe is operative to automatically level liquid loads between said first end chamber and second end chamber at any level and said insulated pipe and said first port are together operative to empty liquid loads from both said first end chamber and said second end chamber by gravity, said insulated pipe extending without rising from said second end chamber to said first end chamber.

13. The vehicle of claim 11 wherein said first end chamber includes a floor which slants down towards said center chamber and said second end chamber includes a floor which slants down towards said center chamber.

14. The vehicle of claim 11 further including a valve for selectively blocking said pipe.

15. The vehicle of claim 14 wherein said pipe extends through said center chamber.

* * * * *